United States Patent
Creed et al.

[11] Patent Number: 6,155,163
[45] Date of Patent: Dec. 5, 2000

[54] PEEL MATERIAL ACIDIFICATION APPARATUS

[75] Inventors: Sherman Howell Creed; Rey A. Elizondo; Robert Leland Frenkel, all of Fresno; Lloyd F. Hay, Oakdale; Westley W. Walter, Madera, all of Calif.

[73] Assignee: FMC Corporation, Chicago, Ill.

[21] Appl. No.: 09/429,222

[22] Filed: Oct. 28, 1999

Related U.S. Application Data

[62] Division of application No. 09/143,599, Aug. 31, 1998, Pat. No. 6,007,855.

[51] Int. Cl.$^7$ .............................. A01K 43/00; A23K 1/00
[52] U.S. Cl. ............................ 99/516; 99/348; 99/767; 99/487; 99/534
[58] Field of Search .......................... 99/348, 467, 473, 99/486, 487, 516, 534–536; 366/279, 314; 426/231, 615, 626, 478, 479, 482

[56] References Cited

U.S. PATENT DOCUMENTS

| | | | |
|---|---|---|---|
| 3,873,753 | 3/1975 | Nelson et al. | 9/484 X |
| 4,082,859 | 4/1978 | Katzen | 426/636 |
| 4,437,934 | 3/1984 | Nelson et al. | 99/486 X |
| 4,557,799 | 12/1985 | Nelson et al. | 99/486 |
| 5,361,683 | 11/1994 | Silvestrini et al. | 99/470 X |
| 5,375,654 | 12/1994 | Hougland et al. | . |
| 5,436,022 | 7/1995 | Chiang et al. | 426/626 |

*Primary Examiner*—Timothy Simone
*Attorney, Agent, or Firm*—Flehr Hohbach Test Albritton & Herbert LLP

[57] ABSTRACT

A tomato peel material acidification system (10) including a receiving tank (32), a pump (36), acid injection devices (46, 48), mixing devices (38, 39), and a return line (52) for recirculating tomato peel material with an acid level that is too high. PH sensor probes (56, 58, 60) test the pH level of the tomato peel and acid mixture and appropriate controls direct the opening and closing of valves (50, 51, 54, 55) to re-direct the mixture back into the receiving tank.

22 Claims, 4 Drawing Sheets

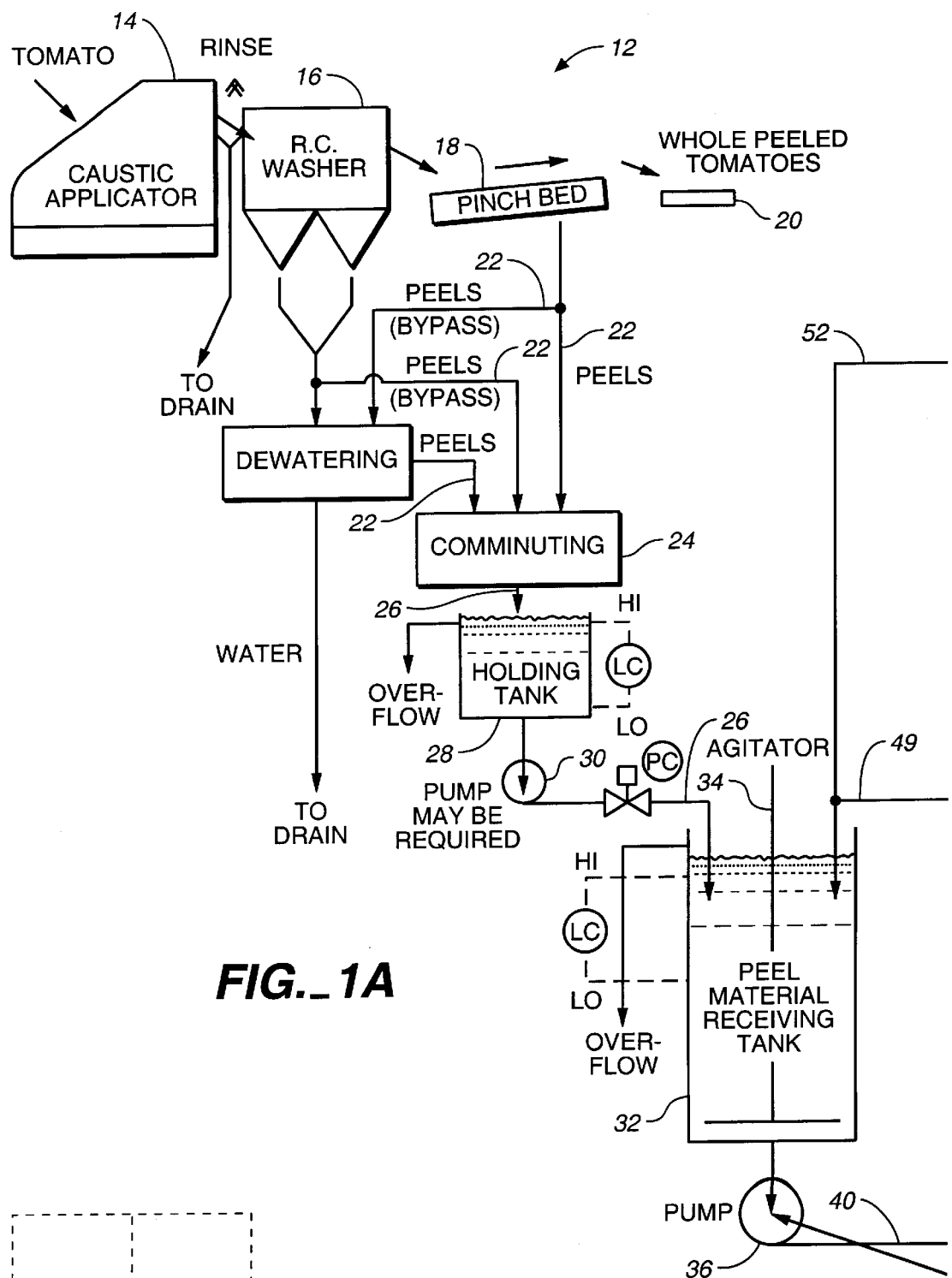
FIG._1A
FIG._1

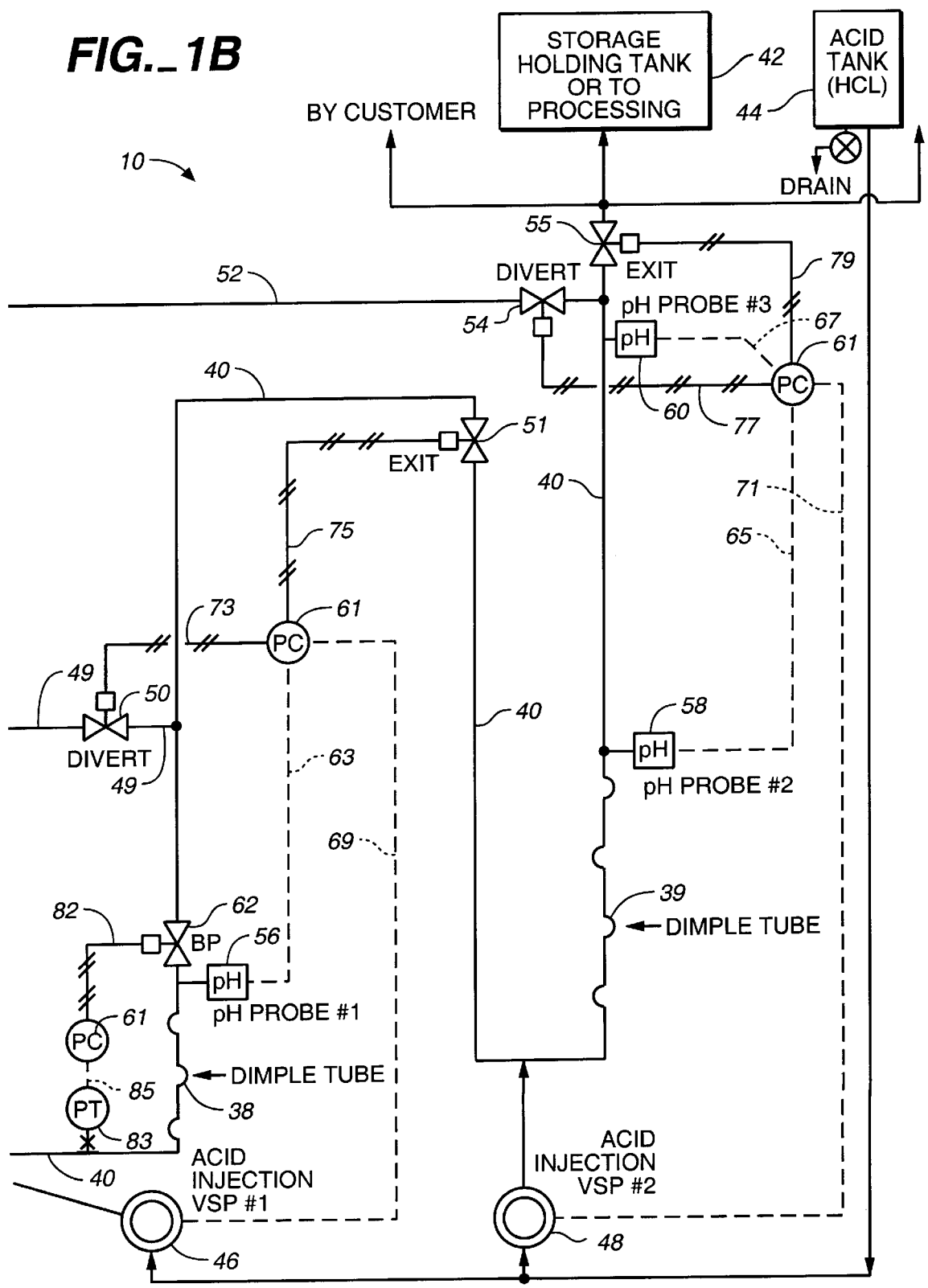
FIG._1B

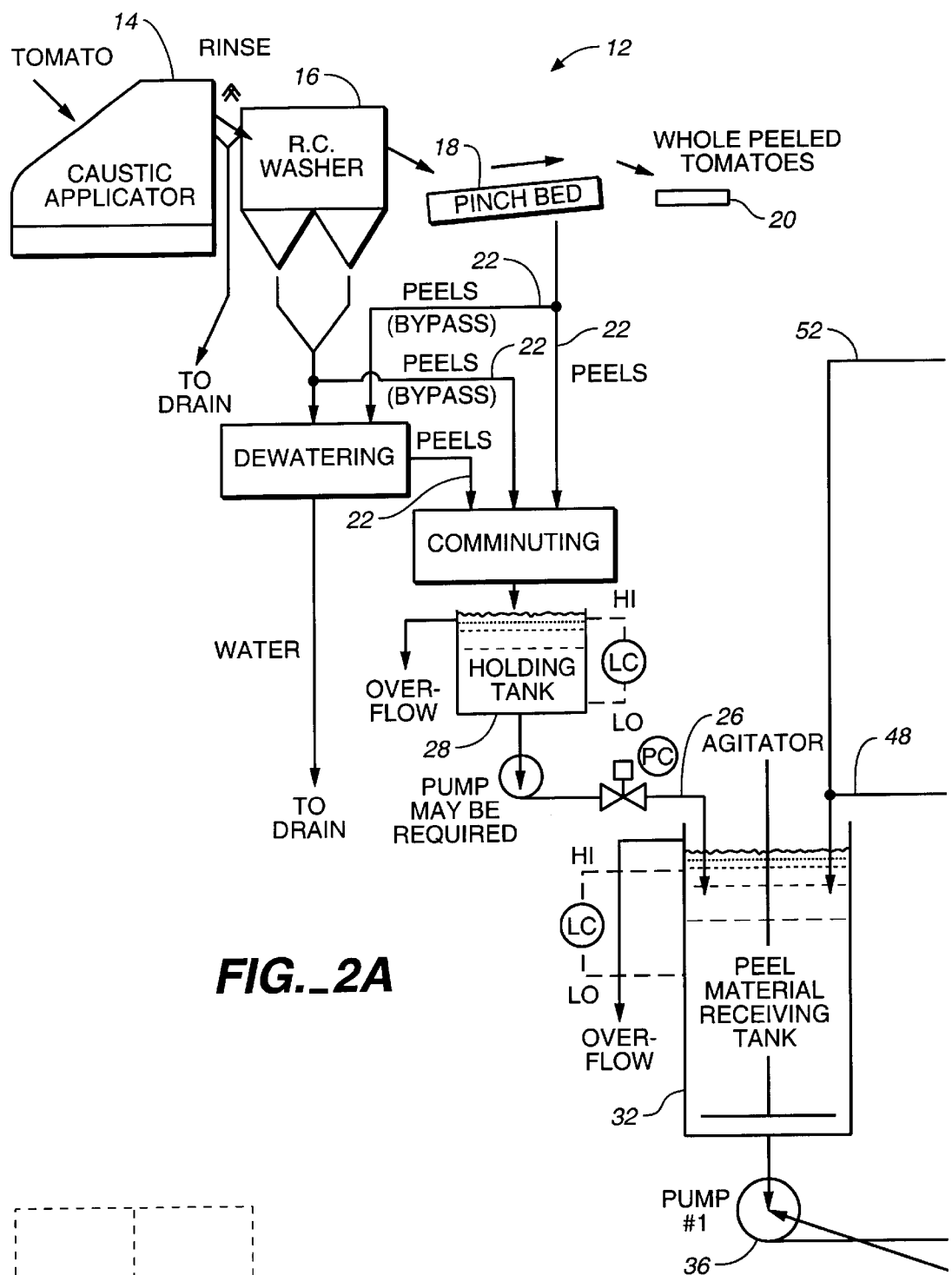
FIG._2A
FIG._2
FIG._2A | FIG._2B

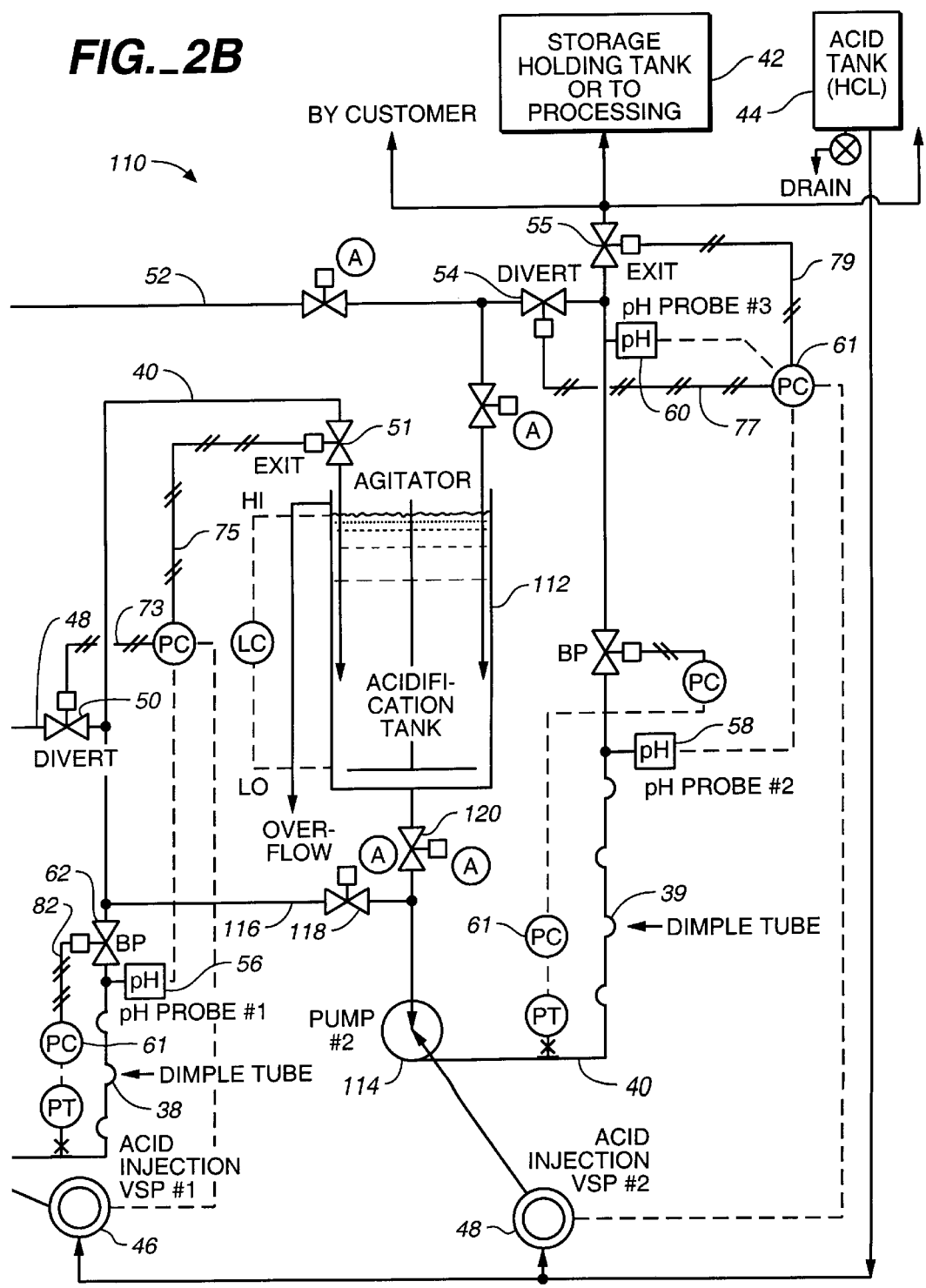
FIG. _2B

PEEL MATERIAL ACIDIFICATION APPARATUS

This is a division of application Ser. No. 09/143,599 filed Aug. 31, 1998, now U.S. Pat. No. 6,007,855.

TECHNICAL FIELD

The present invention relates to a apparatus and process for adding acid to tomato peel material after removal of the peels from tomatoes for the purpose of establishing a desirable pH.

BACKGROUND ART

In automated tomato processing facilities, it is common to process tomato peels after removal from tomatoes by adding acid, such as HCL acid, to the tomato peels and then adding the acidified tomato peel material to a product such as pizza sauce, which needs salt. Tomatoes typically have a pH level of about 4.0, but tomato peel material can have a pH level as high as 13.0 pH when removed by a lye applicator process. It is desirable to lower the pH level, and thus raise the acid level of tomato peel material, closer to approximately the 4.0 pH level of whole tomatoes, so that the peel material is suitable for use in pizza sauces and other commercial food products.

One process for acidifying tomato peels is to introduce batches of tomato peels into an acidification tank, add acid to the peel material, circulate the tomato peels and acid in order to mix the two, and then test the pH of the peel material. If the pH needs adjusting, the appropriate acid level adjustment is made and the material is mixed until the acid level is correct. When the acid level is within an acceptable range, the material is pumped out of the tank and a new batch of tomato peel material is then introduced into the tank to be acidified.

The batch system has several drawbacks, one of which is inconsistent mixing of the tomato peel material and acid, and another of which is a slower than desired processing rate. Full, uniform mixing of the peel material and the acid is not always achieved due to differences in size of peel material chunks and due to the limited extent a circulation system can fully mix the material. In addition, the batch system is inherently slow because the next batch of tomato peel material cannot be acidified until acid level of the current batch is raised to the desired level. The system and process of the present invention seeks to address these problems and provide a continuous system that achieves a quick, uniform acidification rate.

DISCLOSURE OF INVENTION

Briefly described, the acidification system of the present invention comprises a pump for circulating tomato peel material through the system, an acid injection device for adding acid to the tomato peel material, a mixing device for mixing the tomato peel material and acid after the acid has been added, and a recirculation line for returning mixed tomato peel material and acid to a point upstream of the acid injection device.

The provision of a continuous circulation system in combination with a recirculation line, along with a mixing device that thoroughly mixes the tomato peel material with the acid, allows for greatly increased, continuous processing rates over prior art batch systems and also provides improved control over pH levels in the resulting tomato peel material.

According to an aspect of the invention, the mixing device includes tubing formed to enhance mixing of the tomato peel material and acid. Preferably, the tubing comprises dimple tubing that is positioned between the acid injection device and the recirculation line.

According to another aspect of the invention, the acid injection device is adapted to add acid to the tomato peel material at a first acid injection point and a second acid injection point. In addition, the system further comprises a second recirculation line downstream of the second acid injection point for selectively returning mixed, acidified tomato peel material to a point upstream of the first acid injection point. In this manner, a dual acid injection system is provided, which increases the processing rate of the system while enhancing proper acidification of the tomato peel material by reducing the amount of material requiring recirculation.

According to yet another aspect of the invention, the mixing device comprises a first mixing device downstream of the first acid injection point and a second mixing device downstream of the second acid injection point. Provision of two mixing devices, each after an acid injection point, increases thorough mixing of the tomato peel material prior to pH testing.

The present invention also includes a process for adding acid to tomato peel material comprising the steps of pumping the tomato peel material from a receiving tank; as the tomato peel material is being pumped, adding acid to the tomato peel material; mixing the tomato peel material and acid; and testing the pH level of the tomato peel material and acid mixture; and alternatively or collectively, if the pH level is too high, then adding more acid to the tomato peel and acid mixture, and/or if the pH level is too low, returning the tomato peel and acid mixture to the receiving tank.

According to an aspect of the process of the invention, an additional step is provided of temporarily storing the tomato peel and acid mixture in an acidification tank prior to adding additional acid to the mixture. An additional acidification tank allows for increased mixing time to ensure thorough mixing of the tomato peel material and acid, which may be desirable and/or necessary for some applications.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a schematic diagram of a first embodiment of a peel material acidification system; and FIG. 2 is a schematic diagram of a second embodiment of a peel material acidification system.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

FIG. 1 shows a first embodiment for a peel material acidification system 10 that is designed for use in acidifying tomato peel material that is received from a tomato peeler system 12. Tomato peeler system 12 is shown for exemplary purposes and the particular type of peeler equipment used to remove tomato skins from whole tomatoes is not germane to the present invention. As designed, the peel material acidification system of the present invention processes tomato peel material regardless of the process used to remove the skins.

Briefly, the illustrated tomato peeler system 12 includes a caustic lye applicator 14 where sodium hydroxide (NaOH) solution is applied to the tomatoes to loosen the skins from the bodies of the tomatoes. The tomatoes are then moved through a scrubber 16 and a pinch roller 18 where the skins are scrubbed or pulled from the tomato bodies. Whole peeled tomatoes 20 are then transferred to processing lines for canning, typically either as whole, diced, crushed or pureed tomatoes. My patent application, Ser. No. 09/103,798, now abandoned, entitled "Sorter and Method for Sorting Soft and Broken Tomatoes" describes tomato processing operations in more detail.

From the scrubber 16 and pinch roller 18, tomato peel material 22 is transferred to a comminuting machine 24 where the peel material is chopped to a near paste consistency prior to acidification. Finely chopping the peel material has been found to be important to the acidification process because it enhances uniform acidification of the peel material. From the comminuting machine 24, tomato peel material 26 is pumped to a holding tank 28, which may or may not be necessary, depending on the processing facility.

Peel acidification system 10 receives tomato peel material 26 from holding tank 28 via a pump 30 and holds the material in a receiving tank 32, which includes an agitator 34 for stirring the tomato peel material. Receiving tank 32 functions as an inlet station for the acidification system. A second pump 36 pumps the tomato peel material from receiving tank 32 through a flow path generally defined by conduit line 40. The flow path includes at least one mixing device, which for example may comprise a first dimple tubing length 38 and a second dimple tubing length 39. The tomato peel material is pumped through conduit line 40 to an outlet station in the form of a storage holding tank 42 or to subsequent processing equipment.

System 10 also includes an acid storage tank 44 and a pair of acid injection pumps 46, 48, which function as acid injection points where acid is introduced into the tomato peel material. Acid injection pump 46 preferably introduces acid at a point between system pump 36 and the first set of dimple tubing 38. In this manner, dimple tubing 38 immediately mixes the tomato peel material and the acid after the acid is introduced into the tomato peel material.

Peel acidification system 10 also includes a first return line 49 and a diverter valve 50, which together re-direct the tomato peel and acid mixture back into receiving tank 32 if necessary. A stop valve 51 in line 40 works in conjunction with diverter valve 50 to re-direct tomato peel material into return line 49. A second return line 52, which includes a diverter valve 54, operates in a similar fashion to re-direct tomato peel and acid mixture downstream of mixing device 39 back into receiving tank 32. A second stop valve 55 works in conjunction with second diverter valve 54 to re-direct tomato peel material into return line 52. First return line 49 draws tomato peel material from line 40 prior to the second acid injection pump 48, which may be necessary if the pH level is relatively high, while second return line 52 draws tomato peel material from a point downstream of second acid injection pump 48. Two acid injection pumps and two return lines are provided in order to make the system more efficient, as discussed later.

Peel acidification system 10 further includes at least one and preferably three pH probes 56, 58, 60. pH probe 56 tests the pH of the tomato peel and acid mixture immediately after the material passes through dimple tubing 38. If the acid level is too high (pH level too low) or way too low (pH level too high), then diverter valve 50 can be opened and stop valve 51 closed to re-direct the tomato peel and acid mixture back into receiving tank 32. Re-directing the tomato peel material with a high acid level (and low pH) into non-acidified tomato peel material in the receiving tank dilutes the material and lowers its acid level (raises the pH of the re-cycled peel material).

If the acid level is too low (high pH), then diverter valve 50 is kept closed and additional acid is introduced by pump 48, to raise the acid level (and lower the pH level) to within an acceptable range. A computer controller (PC) 61 is electrically connected at 63, 65 and 67 to probes 56, 58 and 60 and is responsive to signals therefrom to control flow rates for pumps 46, 48, through electrical connections 69 and 71, in order to properly adjust the acid level of the tomato peel material.

As schematically shown in the drawing, controller (PC) 61 is illustrated for convenience at three locations, but preferably controller 61 is a single controller, which may for example comprise a general purpose digital computer with appropriate software, or a dedicated controller apparatus. Controller (PC) also communicates control signals to solenoid-actuated flow control valves 50, 51, 54, 55 and 62 through electrical connections 73, 75, 77, 79 and 82, respectively.

Dimple tubing 38, 39 collectively form a mixing device for uniformly mixing the acid with the tomato peel material. While dimple tubing is schematically shown in the drawing, it should be noted that other types of mixing devices can be used which should be apparent to those skilled in the art. Dimple tubing is desirable because it is relatively inexpensive and it does not significantly impede the continuous flow of tomato peel material through the system because of its smooth contours that do not accumulate material.

Dimple tubing 38, 39 includes approximately 1-inch diameter dimples that protrude approximately ⅜ of an inch into the tubing and which are staggered along the length of the tubing. As the tomato peel and acid mixture passes through the tubing, the inwardly protruding dimples create sufficient turbulence to thoroughly mix the tomato peel material with the acid. Suitable dimple tubing is disclosed in U.S. Pat. No. 5,375,654, issued Dec. 27, 1994. Other types of turbulating heat exchange tubes may also be used.

PH probe 58 works in a similar fashion to probe 56 to test the pH level of the tomato peel material after passing through dimple tubing 39. If the pH level at this point is not within an acceptable range, then diverter valve 54 is opened and stop valve 55 closed to re-direct the tomato peel material back into the receiving tank 32. If the tomato peel and acid mixture has an acceptable pH level, diverter valve 54 is kept closed and valve 55 opened to direct the mixture into storage holding tank 42.

PH probe 60 is a back-up probe that measures the pH of the tomato peel mixture immediately prior to exiting the system. If the pH level is out of range, then diverter valve 54 is opened and exit valve 55 closed to re-direct the mixture back into the receiving tank 32.

Finally, a back pressure valve 62 is provided immediately downstream of pH probe 56 and before return line 49. Back pressure valve 62 works through controller (PC) 61 in conjunction with centrifugal pump 36 to maintain a constant flow rate through conduit line 40 by receiving signals from a pressure transducer (PT) 83 via electrical connection 85.

Peel acidification system 10 has several advantages over the prior art batch processing system discussed earlier. First, the present system is a continuous pump-through system where tomato peel material is continuously drawn from receiving tank 32 and pumped into storage tank 42 (or out of the system to further processing). A continuous flow-through system greatly increases processing rates. Second, return lines 49, 52 allow for adjustment of the pH level, if necessary, by re-directing the tomato peel and acid mixture back through the system, and work in conjunction with the pump and the mixing system to allow for continuous flow of the tomato peel material while making appropriate adjustments to the pH level of the tomato peel material. Third, the dimple tubes of the mixing device are made a part of the flow-through conduit and thus allow for continuous pumping while providing thorough mixing of the tomato peel material. These advantages, individually and collectively, provide a significantly improved system and process for acidifying tomato peel material.

FIG. 2 shows a modified embodiment of the system of FIG. 1. Peel acidification system 110 receives tomato peel material from a peeler system 12 and acidifies the material in a similar manner to system 10, but does so with additional equipment and steps that may be desirable or necessary for some applications. Peel acidification system 110 include all of the components of system 10, but also includes an acidification tank 112 and a second pump 114 in conduit line 40 to pump tomato peel material from acidification tank 112 to the storage tank 42. A bypass line 116 is provided, which in conjunction with valves 118, 120, can bypass acidification tank 112 if desired. By closing stop valve 51 and valve 120, and opening valve 118, acidification tank 112 is bypassed and system 110 operates like system 10 of FIG. 1. Valves 118 and 120 can be manual valves or solenoid-actuated and can be electrically connected to controller (PC) 61 for control of operation.

For some applications, it may be desirable to provide an acidification tank to ensure uniform acidification of all of the tomato peel material. This may be particularly necessary if the tomato peel material is not fully chopped up prior to entering the system or if extremely high processing rates are necessary. After tomato peel material has had sufficient time to acidify in acidification tank 112, a final acid adjustment is provided by acid injection pump 48 prior to pumping the mixture to the storage holding tank 42. While acidification tank 112 temporarily slows flow of the tomato peel and acid mixture, the system is still considered a continuous, flow-through system due to the fact that the mixture is continuously pumped through tank 42 and mixed at the same time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

The invention claimed is:

1. An acidification system for adding acid to tomato peel material, comprising:
    a pump for continuously circulating the tomato peel material through a conduit from an inlet station to an outlet station thereof,
    an acid injection device for adding acid to the tomato peel material as it is circulated through the conduit, and
    a mixing device for mixing the tomato peel material and acid as it is circulated through the conduit.

2. The system of claim 1 wherein the system further includes a conduit assembly through which the tomato peel material and acid are pumped.

3. The system of claim 2 the mixing device forms part of the conduit assembly and mixes the tomato peel material and acid as they are pumped through the conduit assembly.

4. The system of claim 3 wherein the mixing device includes tubing formed to enhance mixing of the tomato peel material and acid.

5. The system of claim 4 wherein the tubing comprises dimple tubing.

6. The system of claim 5 and further comprising a back pressure control for regulating flow of tomato peel material and acid through the mixing device.

7. The system of claim 1 wherein the acid injection device is adapted to add acid to the tomato peel material at a first acid injection point and a second acid injection point.

8. The system of claim 7 wherein the acid injection device includes a first and second acid injectors, one upstream of the recirculation conduit and one downstream of the recirculation conduit.

9. The system of claim 1 and further comprising
    a recirculation conduit for returning mixed tomato peel material and acid to a point upstream of the acid injection device.

10. The system of claim 9 and further comprising a second recirculation line downstream of the second acid injector for returning mixed, acidified tomato peel material to a point upstream of the first acid injector.

11. The system of claim 10 wherein the mixing device comprises a first mixing device downstream of the first acid injector and a second mixing device downstream of the second acid injector.

12. The system of claim 11 and further comprising a first pH sensor downstream of the first mixing device and a second pH sensor downstream of the second mixing device.

13. The system of claim 12, wherein the conduit assembly includes valve devices for directing mixed tomato peel material and acid into the recirculation conduits.

14. The system of claim 13 and further comprising a controller for receiving signals from the pH sensors and for controlling the valves in response thereto.

15. The system of claim 9 and further comprising an acidification tank in the conduit assembly between the first and second acid injectors.

16. The system of claim 15 and further comprising a bypass line for bypassing the acidification tank.

17. The system of claim 1 and further comprising a peel material receiving reservoir from which the pump draws tomato peel material.

18. The system of claim 1 and further comprising a pH sensor downstream of the mixing device.

19. An acidification system for adding acid to tomato peel material, comprising:

a peel material receiving reservoir, a conduit assembly leading from the peel material receiving reservoir to an outlet station, a pump for circulating the tomato peel material through the conduit from the reservoir to the outlet station, first and second acid injectors for adding acid to the tomato peel material as it is circulated in the system, and first and second mixing devices in the conduit assembly for mixing the tomato peel material and acid as it is circulated, the first mixing device being downstream of the first acid injector and the second mixing device being downstream of the second acid injector.

20. The system of claim 19 and further comprising an acidification tank between the first and second acid injectors.

21. The system of claim 20 and further comprising a bypass line in the conduit assembly for bypassing the acidification tank.

22. The system of claim 19 and further comprising, first and second recirculation conduits for returning mixed tomato peel material and acid to a point upstream of the acid injection device, the first recirculation conduit being downstream of the first mixing device and the second recirculation conduit being downstream of the second mixing device.

* * * * *